US012643134B2

(12) United States Patent
Heintz et al.

(10) Patent No.: US 12,643,134 B2
(45) Date of Patent: Jun. 2, 2026

(54) TREATMENTS TO ACCELERATE DEGRADATION OF PLASTICS

(71) Applicant: Battelle Memorial Institute, Columbus, OH (US)

(72) Inventors: Amy M. Heintz, Dublin, OH (US); Jacob Lilly, Columbus, OH (US); Christopher Buurma, Gahanna, OH (US); Ryan W. Daly, Columbus, OH (US); John Bartholomew, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 227 days.

(21) Appl. No.: 18/563,429

(22) PCT Filed: May 24, 2022

(86) PCT No.: PCT/US2022/030795
§ 371 (c)(1),
(2) Date: Nov. 22, 2023

(87) PCT Pub. No.: WO2022/251268
PCT Pub. Date: Dec. 1, 2022

(65) Prior Publication Data
US 2024/0253096 A1 Aug. 1, 2024

Related U.S. Application Data

(60) Provisional application No. 63/192,507, filed on May 24, 2021, provisional application No. 63/192,510, filed on May 24, 2021.

(51) Int. Cl.
*B09B 3/35* (2022.01)
*B02C 18/08* (2006.01)
(Continued)

(52) U.S. Cl.
CPC .............. *B09B 3/35* (2022.01); *B02C 18/086* (2013.01); *B02C 18/2283* (2013.01);
(Continued)

(58) Field of Classification Search
CPC ...... B29B 2017/044; B29B 2017/0476; B29B 2017/0484; B02C 18/086; B02C 19/0093; B09B 3/35; B09B 2101/75
See application file for complete search history.

(56) References Cited

U.S. PATENT DOCUMENTS 5,169,588 A 12/1992 Estepp
5,197,678 A * 3/1993 Trezek .................... B29B 13/10
241/DIG. 38
(Continued)

FOREIGN PATENT DOCUMENTS

CN 107930746 A * 4/2018 ............. B02C 23/40
CN 108080079 A * 5/2018 ............... B02C 4/10
(Continued)

OTHER PUBLICATIONS

Extended European Search Report and Search Opinion in European Patent Application No. EP 22 812 018.4 mailed Mar. 28, 2025.
(Continued)

*Primary Examiner* — Jared O Brown
(74) *Attorney, Agent, or Firm* — Susanne A. Wilson; Frank Rosenberg

(57) ABSTRACT

Apparatus, systems (including solvent or enzyme), and methods of degrading plastic are described. Plastic waste is stretched in the presence of solvent. The surface may be further treated to increase hydrophilicity. The resulting plastics can be treated with plastic-degrading enzyme either with microorganisms or direct application of enzyme.

14 Claims, 11 Drawing Sheets

(51) Int. Cl.

| | | |
|---|---|---|
| *B02C 18/22* | (2006.01) |
| *B02C 19/00* | (2006.01) |
| *B02C 23/06* | (2006.01) |
| *B09B 3/60* | (2022.01) |
| *B09B 3/70* | (2022.01) |
| *B09B 101/75* | (2022.01) |
| *B29B 17/04* | (2006.01) |
| *C08J 11/08* | (2006.01) |
| *C08J 11/10* | (2006.01) |

(52) U.S. Cl.

CPC .............. *B02C 23/06* (2013.01); *B09B 3/60* (2022.01); *B09B 3/70* (2022.01); *B29B 17/04* (2013.01); *C08J 11/08* (2013.01); *C08J 11/105* (2013.01); *B02C 19/0093* (2013.01); *B09B 2101/75* (2022.01); *B29B 2017/044* (2013.01); *B29B 2017/0476* (2013.01); *B29B 2017/0484* (2013.01); *C08J 2367/02* (2013.01); *Y02W 30/62* (2015.05)

(56) References Cited

U.S. PATENT DOCUMENTS

| | | | | |
|---|---|---|---|---|
| 5,312,052 A | * | 5/1994 | Dellekamp | ............... B02C 4/02 |
| | | | | 241/24.19 |
| 5,328,104 A | | 7/1994 | Lima et al. | |
| 5,335,786 A | | 8/1994 | Roberto | |
| 5,516,473 A | | 5/1996 | Bakeev et al. | |
| 5,746,378 A | * | 5/1998 | Beadle | ............... B02C 19/0093 |
| | | | | 241/99 |
| 8,834,795 B2 | | 9/2014 | Arzhakova et al. | |
| 2008/0145580 A1 | * | 6/2008 | McAllister | ............... B32B 5/16 |
| | | | | 52/794.1 |
| 2008/0296260 A1 | | 12/2008 | Tserepi et al. | |
| 2016/0280881 A1 | | 9/2016 | Boisart et al. | |
| 2019/0017202 A1 | | 1/2019 | Cesko | |
| 2019/0292341 A1 | | 9/2019 | Kim et al. | |

FOREIGN PATENT DOCUMENTS

| | | | | |
|---|---|---|---|---|
| CN | 108890922 A | 11/2018 | | |
| EP | 1364713 B1 | 3/2011 | | |
| EP | 3795255 A1 | * | 3/2021 | ............ B02C 23/10 |
| JP | 6951688 B2 | 10/2021 | | |

OTHER PUBLICATIONS

Machine Translation of the Description of EP 1364713 B1.

Machine Translation of the Description of CN 108890922 A.

Toncelli, C. et al. "Oxygen-Sensitive Phosphorescent Nanomaterials Produced from High-Density Polyethylene Films by Local Solvent-Crazing", Analytical Chemistry 2014, 86 (3), 1917-1923.

Arzhakova, O. et al., "Development of a stable open-porous structure in the solvent-crazed high-density polyethylene", Inorganic Materials: Applied Research 2011, 2 (5), 493-498.

Narangerel "Solvent crazing as a means to prepare poly(ethylene terephthalate) composite fibers." in Von der Fakultät für Mathematik, Masters Thesis, 2015.

Hassan et al. "Plasma etching and modification of polyethylene for improved surface structure, wettability and optical behavior", Surface Review and Letters 26(7) 2018.

Fecker, Tobias, et al. "Active site flexibility as a hallmark for efficient PET degradation by I. sakaiensis PETase." Biophysical journal 114.6 (2018): 1302-1312.

Goldade et al. "Modifications of synthetic fibers." Chapter in the book titled, "Crazing Technology for polyester Fibers." 2017.

Translation of JP 6951688 B2.

Written Opinion and International Search Report from International Application No. PCT/US2022/030795 date of mailing Oct. 18, 2022.

International Preliminary Examination Report on Patentability from International Application No. PCT/US2022/030795 dated Nov. 21, 2023.

\* cited by examiner

66

67

TREATMENTS TO ACCELERATE DEGRADATION OF PLASTICS

RELATED APPLICATIONS

This application is a United States National Stage Application under 35 U.S.C. § 371 of International Application Serial No. PCT/US22/30795 filed May 24, 2022 which claims the priority benefit of U.S. Provisional Patent Applications 63/192,507 and 63/192,510 filed 24 May 2021.

GOVERNMENT RIGHTS CLAUSE

This invention was made with Government support under contract 100138002 awarded by the U.S. Department of Defense. The Government has certain rights in this invention.

INTRODUCTION

Crazing is a heterogeneously localized plastic deformation, in which microvoids form in stress-induced, plastically softened zones. These microvoids form more readily when solvent is added. Crazing has been shown to generate very high surface area in plastics.

Toncelli et al. have reported tensile drawing of a HDPE film or fiber in n-heptane yielded HDPE with 55-60% porosity and pore dimensions ranging from 5 to 15 nm. Solvent was spotted locally on thin film samples, 85 μm thick, prior to drawing. Dye molecules penetrated into the formed nanoporous structure where it was reported that the dye molecules were finely dispersed and enclosed. See Toncelli, C.; Arzhakova, O.; Dolgova, A.; Volynskii, A.; Bakeev, N.; Kerry, J.; Papkovsky, D., Oxygen-Sensitive Phosphorescent Nanomaterials Produced from High-Density Polyethylene Films by Local Solvent-Crazing. Analytical Chemistry 2014, 86 (3), 1917-1923.

Arzhakova et al. reported drawing HDPE films with 25 μm thickness in heptane. Arzhakova, O.; Dolgova, A.; Yarysheva, L.; Volynskii, A.; Bakeev, N., Development of a stable open-porous structure in the solvent-crazed high-density polyethylene. Inorganic Materials: Applied Research 2011, 2 (5), 493-498. In U.S. Pat. No. 8,834,795, Arzhakova et al. report solvent-crazed O2 sensor that can be impregnated with an indicator dye by processing polymer tape that is 25 μm thick. The inventors stated that the solvent crazed O2 sensor can be coated by applying enzyme solution on its surface and crosslinking the enzyme with glutaraldehyde to produce sensors for glucose, lactate and other substrates of oxygen-dependent enzymes. In the prior art example, the sample dimensions (width and thickness) are small (10-500 mm width, 25-100 μm thickness) and designed to minimally deform the thin/small material. Because Arzakhova is minimally deforming the material only to include small surface nanopores, they do not have to be concerned with necking and their process operates with constant tension.

A review of crazing to increase surface area of polymers can be found in the Master's Thesis of Narangerel in Von der Fakultät für Mathematik, Masters Thesis, "*Solvent crazing as a means to prepare poly(ethylene terephthalate) composite fibers.*" 2015. Narangerel reported that the porosity obtained by solvent crazing strongly depends on the ability of the active liquid to lower the surface energy of polymer, viscosity of the liquid (which determines the rate of the liquid delivery into the growing crazes), strain and strain rate, polymer crystallinity and cross-sectional dimensions, as well as on the difference between the process temperature and the polymer glass transition temperature. Narangerel reported that composite material was made of keratin-based oligopeptides and polyester (PET) via solvent crazing technique. The water uptake of the keratin modified fibers stretched to 200% strain was more than 10 higher than the value for keratin free, non-stretched fibers. Naragerel concluded that "this simple method of obtaining composite material based on synthetic polymer and bio oligopeptides presents an economic and environmentally friendly approach to produce composites for sanitary and medical uses, technical textiles particularly filters for heavy metals from waste waters and to improve the surface area of PET for environmental degradation." See page 105. Additional background information is provided in chapter 3 "Solvent Crazing and Mechanical Response of Polymer" in Studies in Polymer Science, vol. 13, 1995, (pp. 137-206).

Various treatments to increase hydrophilicity of polymers have been reported in the literature. For example, Hassan et al. in Surface Review and Letters 26(7) 2018, "Plasma etching and modification of polyethylene for improved surface structure, wettability and optical behavior," reported on O2 plasma treatment of LDPE to tune wettability. Other examples of plasma etching are described in US Patent Publications Nos. 2008/0296260 and 2019/0292341.

SUMMARY OF THE INVENTION

Recalcitrant plastics, such as polyethylene (HDPE or LDPE), polypropylene and polyethylene terephthalate are persistent environmental pollutants. There is growing interest to develop new approaches that complement traditional recycling processes. For example, using enzymes to breakdown plastic into harmless byproducts or to upcycle to higher value constituents. We describe a system that enzymatically degrades plastic to useful monomers or oligomers that can then be built-up to useful products like lubricants.

Enzymes have been demonstrated to degrade PET to ethylene glycol and terephthalic acid. See Fecker. Tobias. et al. "Active site flexibility as a hallmark for efficient PET degradation by *I. sakaiensis* PETase." *Biophysical journal* 114.6 (2018): 1302-1312. Enzymes have been demonstrated to degrade polyamides, polyolefins, and many other polymers. Regardless of the enzyme, a critical challenge is achieving efficient mass transfer. Reaction rates scale with the enzyme activity and mass transfer rate. The reaction between plastic and aqueous enzyme solution is a heterogeneous reaction. A heterogenous reaction is a reaction in which the reactants are in different phases. In this case, the plastic is in a solid phase and the enzyme is in an aqueous phase. The rate limiting step in the plastic degradation reactions is getting the enzyme to the plastic surface, e.g., mass transfer, and is addressed by increasing solid surface area and/or increasing liquid flow. Increasing flow has an energetic penalty. Mechanical reduction of particle size (D) increases surface area, but it is energetically costly, scaling with $1/\sqrt{D}$. Equipment to achieve sub-microscale particles, and, therefore, very high surface areas, also tend to be unreliable, owing to wear and clogging.

In one approach, we provide a solvent induced crazing-process to generate enzyme-accessible porosity into the plastic. Small volumes of solvent, preferably a nontoxic solvent that does not dissolve the plastic, such as ethanol or butanol, are applied to the plastic while stretching or tensioning the plastic. In other embodiments, the tensile stretching required to achieve crazing is replaced by granulation stress.

Crazing produces a complex multi-scale morphology comprised of microscale cracks, or crack networks, and nanoscale pores. To achieve the highest increase in reactivity, the surface area should be high and the cracks and pores accessible. If the pores are accessible the process will readily increase the reactivity of the plastic to enzymes by >>20.

Key determinants of the accessibility are the morphology, e.g., the crack dimensions, pore size (relative to enzyme size), craze density and pore density, and the tortuosity. For crazing, these depend on the solvent-polymer interaction, amorphous structure, film thickness, lamellar morphology, and deformation rate. For a given enzyme, we can use molecular modeling to determine a suitable morphology. Then, this morphology is generated by varying the crazing process conditions, such as strain rates, solvent, and strain, for the plastic of choice. The resultant morphology can be characterized by a variety of methods. Crack dimensions and pore structure can be determined optical microscopy, laser scanning microscopy or scanning electron microscopy (SEM) with pores having a height (largest dimension) to width (perpendicular to height) aspect ratio of 1 to 3 and pore size being volume average based on height. Accessible pores are preferably at least 3 times larger in diameter than the diameter of the enzyme in solution, and more preferably at least 4 times larger with microscale voids leading into the depths of the sample. Thus, in preferred embodiments, the pore size is in the range of 2 to 8 times the enzyme size, in some embodiments 3 to 5 times the enzyme size. The optimal conditions for enhancing reactivity can also be screened experimentally by generating a set of crazed samples, generated under different process conditions, and then characterizing a fluid uptake and dye exchange rates, using a fluid that mimics the reaction solution and a dye that has similar molecular weight as the enzyme (or a dye-tagged on the enzyme of interest), as a metric for the effective diffusivity, seeking to maximize the values.

Accessibility can also be assessed by examining water uptake and dye exchange rates. The dye can be selected to have similar molecular weight as the enzymes. Weight uptake less than 20% would be an indication that an alternative approach, such as chemical etching (below) may be required or that the morphology is not accessible.

In one aspect, the invention provides a plastics degrading system, comprising: a plastic feed passing through a shredder; a solvent contacting the plastic; wherein the shredder comprises one or any combination of the following: a serrated or knurled cutting blade adapted to indent the plastic as it goes through the shredder; blades that are angled, dull, or with spacing to form inefficient cutters but increased tension on the plastic feed as it passes through the blades; a spring loaded pair of blades; a least two pairs of rollers that are adapted to stretch pieces of plastic held between the pairs of rollers (in preferred embodiments, the rollers have projections from the roller surfaces that engage the plastic feed); a serrated die and a movable blade tooth configured such that pieces of the plastic feed contacts and is held by the die surface and the movable blade tooth engages and pulls the feed to generate tension in the feed; and, in the case where the feed is in the form of a film or sheet, a pair of rollers disposed below (with respect to gravity) a hinged trap door, wherein the trap door has a first edge opposite to the side having a hinge, and the first edge is near a fixed surface, and a cam wheel positioned against the trap door such that rotation of the wheel periodically cycles the trap door between an open position and a closed position in which the first edge is pressed toward the fixed surface such that a plastic feed would be held between the first edge and the fixed surface. In some embodiments, the solvent contacts the plastic feed via one or more spray nozzles configured to spray the plastic feed as it passes through the system. In some preferred embodiments, the solvent comprises ethanol or butanol.

In another aspect, the invention provides plastics degrading apparatus, comprising: a plastic feed pathway into and through a shredder; a solvent conduit adapted to contact a plastic feed with a solvent; wherein the shredder comprises one or any combination of the following: a serrated or knurled cutting blade adapted to indent the plastic as it goes through the shredder; blades that are angled, dull, or with spacing to form inefficient cutters but increased tension on the plastic feed as it passes through the blades; a spring loaded pair of blades; a least two pairs of rollers that are adapted to stretch pieces of plastic held between the pairs of rollers (in preferred embodiments, the rollers have projections from the roller surfaces that engage the plastic feed); a serrated die and a movable blade tooth configured such that pieces of the plastic feed contacts and is held by the die surface and the movable blade tooth engages and pulls the feed to generate tension in the feed; and in the case where the feed is in the form of a film or sheet, a pair of rollers disposed below (with respect to gravity) a hinged trap door, wherein the trap door has a first edge opposite to the side having a hinge, and the first edge is near a fixed surface, and a cam wheel positioned against the trap door such that rotation of the wheel periodically cycles the trap door between an open position and a closed position in which the first edge is pressed toward the fixed surface such that a plastic feed would be held between the first edge and the fixed surface. In some embodiments, the solvent conduit comprises a spray nozzle.

In a further aspect, the invention provides a method of degrading a plastic, comprising: passing a plastic feed into the system or apparatus described above to form a shredded, crazed plastic. This method may further comprise contacting the shredded, crazed plastic with a plastic-degrading enzyme. The plastic feed can be sprayed with an organic solvent. In some preferred embodiments, the shredded, crazed plastic is treated with an oxidizing agent such as sulfuric acid.

In another aspect, the invention provides a method of degrading a plastic, comprising: applying a variable tension stress to a plastic feed in contact with an organic solvent as the feed passes through a shredder to form a shredded, crazed plastic. The shredded, crazed plastic can be treated with an oxidizing agent. The shredded, crazed plastic can be contacted with a plastic-degrading enzyme. In preferred embodiments, the variable tension stress is intermittent or cyclical tension stress.

In another aspect, the invention provides a method of making oligomers and/or monomers, comprising: granulating a plastic material in contact with an organic solvent to form a granulated, crazed plastic; and contacting the granulated, crazed plastic with a plastic-degrading enzyme to form the oligomers and/or monomers. The oligomers and/or monomers can be separated by techniques such as membrane separation, centrifugation, solvent extraction, and/or distillation. The invention also includes methods of making a polymer comprising: contacting the oligomers and/or monomers with a catalyst and forming a polymer.

In a further aspect, the invention provides a method of degrading a plastic, comprising: granulating a plastic material in contact with an organic solvent to form a granulated, crazed plastic; and contacting the granulated, crazed plastic with a plastic-degrading enzyme. Preferably, the plastic material is sprayed with the organic solvent. In another embodiment, the plastic material is immersed in the organic solvent. In some embodiments, at least 80 mass % of the granulated, crazed plastic has a particle size of at least 50 nm, or at least 100 nm, or at least 500 nm, or at least 1000 nm. Particle size can be determined by sieving. In some embodiments, the granulated, crazed plastic is treated with an oxidizing agent such as sulfuric acid.

In another aspect, the invention comprises a composition of matter comprising crazed plastic and a plastic-degrading enzyme or plastic-degrading microorganism wherein the crazed plastic comprises pores having an average maximum diameter that is at least 3 times as large as the plastic-degrading enzyme or plastic-degrading microorganism; wherein the plastic-degrading enzyme or plastic-degrading microorganism has a diameter defined by the maximum length from one side to the other side of the plastic-degrading enzyme or plastic-degrading microorganism; and wherein the average maximum diameter of the pores is based on a surface or a cross-section of the crazed plastic and the average maximum diameter is for a pore having an average area and comprising at least 100 such pores in 1 cm$^2$ of crazed plastic.

In a further aspect, the invention comprises a composition of matter, comprising: a polymer elongated in a direction comprising struts oriented in the direction of elongation; wherein the density of struts having a diameter of 7 μm or less, or in the range of 3 to 7 μm, is at least 100 struts per mm in a direction perpendicular to the direction of elongation. Struts are bands of polymer, such as shown in the figures. The polymer may comprise a plurality of openings with a width in the range of 10 to 20 μm perpendicular to the direction of elongation or in the two directions perpendicular to the direction of elongation, or in the surface of the elongated polymer. Preferably, the composition comprises at least 5 or at least 10 or in the range of 5 to 500 of the openings per cm$^2$ on average in the material. The composition may also comprise 105 to 150 or 105 to 200 struts per mm in a direction perpendicular to the direction of elongation. In some embodiments, the composition comprises alternating bands with relatively higher and lower crystallinity.

This invention also describes methods and equipment that can be used to process plastic articles in a continuous process. This is important for industrial-scale plastic recycling. In one embodiment, a crazer unit can be placed before or after other unit operations that may be necessary to improve the handling and reactivity of the plastic for advanced recycling, including shredding, roughening, or etching. The equipment achieves this continuous processing by continuously tensioning the plastic while in the presence of a solvent. The tension force created between the two rollers and the continuous feed rate between them can be varied to support different types of materials. The tension force can be adjusted quickly via linear springs acting on a large mechanical lever arm for ease of user adjustment. The solvent for wetting the plastic can be varied, and it can be applied in a variety of ways, including but not limited to, spray nozzles, and rollers covered in absorbent material that are soaked in solvent and contact the plastic.

Similar results can be provided by the granulation. The modification of commercial granulator cutters can be supported by Finite Element Analysis (FEA), which has been previously used to predict the stresses associated with plastic cutting.

Even with high surface area, a potential problem is that crazing does not alter the surface energy of the plastic, e.g., it does not improve wetting of the solid interface by the aqueous enzyme solution. HDPE is hydrophobic. Even when imprinted with large pores, it may not be wetted by aqueous enzyme solutions. It is possible to convert polyolefins such as polyethylene and polypropylene into hierarchical (e.g., multi-scale pores), super-hydrophilic structures by mechanical roughening and/or plasma etching with a weak oxidizing agent. A similar method can be used to convert crazed hydrophobic polyolefins into expanded mesopores or hierarchical structures and hydrophilic surface functionality. For example, using sulfuric acid as the oxidizing agent; treatments of 0.1 to 1 h are typically effective. Other oxidizing acids may also be used.

The surface functionality is dependent on the competitive absorption for reactant/product and the rates of conversion with different reactants (e.g., through stabilization of the transition state). Elucidation of these mechanisms can be quantified by developing an attenuated total reflectance (ATR)—Fourier transform infrared (FTIR) spectroscopic technique to study reaction kinetics of target TAI enzymes onto model surfaces. Thin films of the plastic of interest can be applied to the ATR crystal and then treated with the desired oxidation process. The kinetics of enzyme absorption and reaction can be followed in situ, by applying aqueous enzyme solutions to the surface and quantifying changes to spectral signatures, associated with reactive moieties and secondary interactions. By studying as a function of temperature and concentration, one can determine equilibrium constants and reaction rates for different systems.

The invention, in any of its aspects, includes any of the features described herein. The invention provides methods of degrading plastics comprising solvent crazing of plastics in which stress is provided by tensile stress.

In any of its aspects, the invention may be further characterized by one or any combination of the following: the degradation results in oligomers which may be subsequently used to make a product; the solvent crazing is conducted in the presence of an enzyme; the crazing process is conducted simultaneously with or followed by a surface treatment that increases hydrophilicity of the polymer; the tensioning generates bands of crystalline material separated by regions of more amorphous material; unlike conventional processes, the plastic can be subjected to crazing in the form of particulates rather than fibers or films; particulates can be defined as having three perpendicular dimensions with an aspect ratio of width to length of 10 or less, and a thickness of less than width and less than length; wherein thickness of the plastic feed is at least 1 mm, or at least 2 mm, or at least 5 mm; wherein the crazing solvent(s) includes ethylene glycol, isopropanol, anisole, toluene, dichloromethane, ethyl acetate, heptane, acetonitrile, t-butyl methyl ether, acetone, methanol, ethanol, propanol, butanol, and other alcohols or combinations thereof; wherein the mass ratio of plastic to solvent is one hundred or less or 0.1 or more, or in the range of 100 to 0.01 or 10 to 0.1 or 1.0 to 10 or 0.1 to 1.0; wherein the crazed plastic has a volume average pore size of at least 15 nm diameter, or at least 20 nm diameter, or at least 25 nm, and in some cases having a volume average pore size less than 80 nm or less than 50 nm (typically measured by microscopy but could be measured by porosimetry; adding polymer-degrading enzyme or enzyme-generating microorganisms to the crazed plastic; wherein the crazed plastic is not subjected to thermal annealing; wherein the microorganism generates the enzyme while the microorganism is disposed in pores (or cracks) of the crazed enzyme; wherein the plastic feed comprises discrete objects rather than films or sheets; wherein the temperature is maintained below the softening point of the plastic, or below the 50 C, or below 30 C; wherein the treatment imparts at least 20% or at least 50% or at least 100% elongation to the plastic on average; wherein the plastic comprises PET; wherein the plastic comprises a polyolefin; wherein the tension applied to a plastic piece varies by at least 20%, or at least 50%, or in the range of 20-100% during the time that the tension is applied to the piece; wherein tension is applied intermittently with at least a 50% reduction in tension force for at least 0.5 s; wherein the process is conducted to an extent sufficient to increase crystallinity by at least 10% or at least 20% or result in a crystallinity in the range of 10-50% or 20-50% (crystallinity is measurable by differential scanning calorimetry (DSC) a polymer elongated in a direction comprising struts oriented in the direction of elongation wherein the density of struts having a diameter of 7 μm or less, or in the range of 3 to 7 μm, is at least 100 struts per mm in a direction perpendicular to the direction of elongation (struts are bands of polymer, such as shown in the figures); comprising a plurality of openings in the polymer with a width in the range of 10 to 20 μm perpendicular to the direction of elongation; comprising a plurality of openings in the polymer with a width in the range of 10 to 20 μm in the two directions perpendicular to the direction of elongation; comprising a plurality of openings in the surface of the elongated polymer with a width in the range of 10 to 20 μm perpendicular to the direction of elongation; comprising at least 5 or at least 10 or in the range of 5 to 500 of the openings per cm$^2$ on average in the material; comprising 105 to 150 or 105 to 200 struts per mm in a direction perpendicular to the direction of elongation; and/or comprising bands of regions with higher and lower crystallinity that vary by at least 10% in the extent of crystallization; and/or wherein the method decreases polymer thickness by at least 50% or at least 90% or at least 95% in at least 50 mass % or at least 90 mass % of the treated polymer.

The invention also includes systems comprising apparatus, solvent, and plastic (and optionally conditions such as temperature). Likewise, the invention also includes compositions comprising the crazed plastic plus solvent and/or enzyme or microorganisms.

Glossary

In the context of the present invention, "organic solvents" are carbon-containing fluids that interact with plastics more strongly than water (measurable by contact angle).

A "discrete object" is a non-continuous object such as crushed water bottles, packaging containers, articles of clothing, and other plastic waste. According to the present invention, a film or sheeting that can be placed on a roll or processed by roll-to-roll process is not a discrete object.

An "enzyme" is a substance produced by a living organism that can catalyze a chemical reaction. In this case, the desirable chemical reaction is a reaction that degrades a plastic to an oligomer, a monomer, and/or degradation products of an oligomer or monomer.

A "plastic feed" can be any flow of plastic material, typically plastic waste such as bottles, containers, films, sheeting, and other manufactured articles comprising a plastic material.

"Plastics" has the conventional definition of a polymeric material derived from hydrocarbons. Preferred examples include polyethylene, polypropylene, polyethylene terephthalate (PET), polyvinyl chloride, polyamides (nylons), polyesters and polyurethanes.

DETAILED DESCRIPTION OF THE INVENTION

Our invention provides processes and apparatus to achieve compositions with high enzyme accessibility in large-scale, continuous processes appropriate for advanced recycling and other industrial-scale processes, including processing of discrete objects or unpredictable objects, such as plastic waste that is fed into the system. A defect with much of the prior art is that it was focused on thin films, tapes, batch processes, thermal healing or annealing, or other experimental setups such as immersion baths that do not scale. We have found that the formation of enzyme accessible geometry can be obtained using processes for wetting the samples and that thermal annealing can reduce the accessibility. Conventionally, shredders are designed for efficient cutting of the input materials; this means they are designed to avoid stretching the material during processing. We have designed shredders that include both stretching in tension (to achieve crazing) and cutting—either as two separate operations or combined. The shredding process incorporates a solvent; wherein the solvent is selected so that it does not dissolve the plastic but rather has high surface activity, e.g., low surface tension.

In the laboratory, crazing can be achieved by stretching the sample in an Instron while keeping the sample wet with the appropriate solvent; for PET, butanol is one such solvent. According to the methods described here, suitable conditions including the appropriate solvent and stress conditions can be selected using routine laboratory procedures.

Whereas PET typically fails at elongation less than 10%, when crazing occurs, the sample can elongate as much as 200% or more.

Several approaches may be used to convert standard shredders for enhancing crazing. In all cases, the design includes active wetting with solvent during stretching and cutting. Approaches can include: a serrated or knurled cutting blade will indent the plastic as it goes through the shredder; blades that are angled, dull, or with proper spacing will be more inefficient cutters but better at imparting stress on the sample; and/or the addition of a tensioner or roller bar prior to cutting.

Applying a Variable Shear Force

Figure 1:
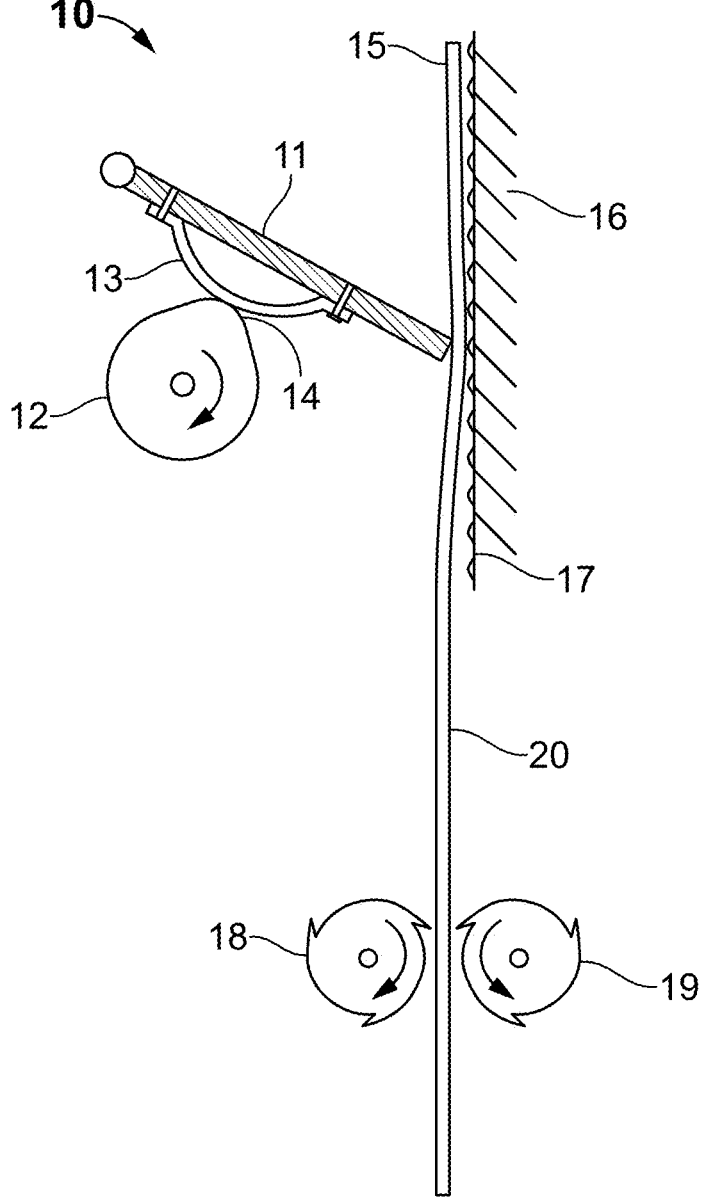
FIG. 1 illustrates apparatus for applying variable tension and variable shear force.

FIG. 1 illustrates a system 10 that applies variable tension to a plastic sheet or strip 15. A trap door 11 rides on a non-circular cam wheel 12 with one or more bumps 14 so that, as the cam turns, the trap door is opened and closed. Optionally, a leaf spring 13 is disposed between the cam and the trap door. On the opposite side of the sheet or strip is a substrate 16; the trap door presses the sheet or strip against the substrate surface 16 that optionally includes surface roughness features 17 that protrude from the surface 16. Rollers 18 pull the sheet or strip creating tension region 20. Optionally blades or barbs can prevent slippage and create abrasions in the sheet or strip. Preferably, the plastic sheet or strip is coated with solvent through the entire system, or at least in the tension region.

Figure 2:
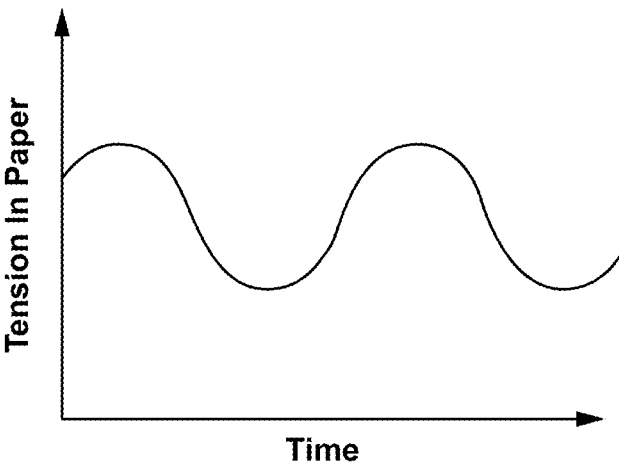
FIG. 2 is an illustrative plot of tension versus time on a plastic sheet or strip as it is pulled through the apparatus.

FIG. 2 shows variable tension and, in any of the aspects of this invention, tension can be varied, preferably by at least 20% or at least 50%.

Figure 5:
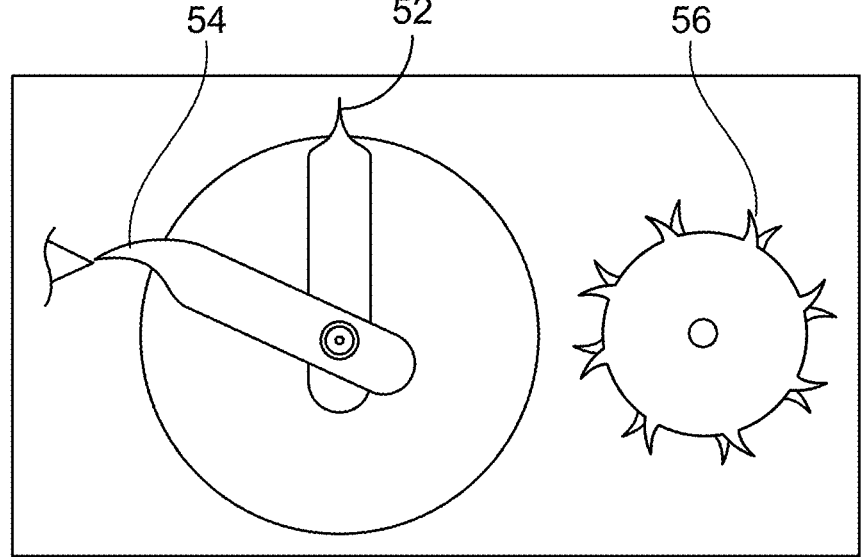
FIG. 5 illustrates a blade tensioner comprising a pair of blades that generate force when rotated relative to each other.

FIG. 5 shows a pair of blades 52, that are spring-loaded. A mechanism squeezes the blades together just before the rear blade engages, producing tension in a sample. Spring-loaded tines 56 may also be used. FIG. 5 is a concept for tensioning the sample without pinch rollers—using an integrated blade tensioner. A solvent spray system is integrated near the fixed cutting die. It utilizes pair(s) of cutting elements that generate force when rotated relative to each other, for example spring loaded to each other. Prior to engaging the workpiece, a mechanism squeezes the blades together. After cutting elements engage the workpiece, the mechanism releases the squeeze and the cutting elements impart tension on the sample. A tensioned portion of the workpiece is then cut by one of the cutting elements passing by fixed cutting die(s). The machine rotates continuously to process large workpieces.

Figure 3:
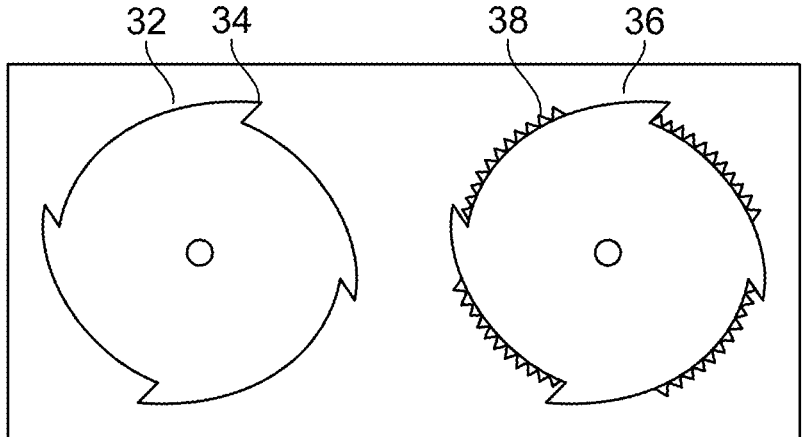
FIG. 3 illustrates a normal cutting disc (left) having blades and a knurled cutting disc (right) comprising knurled faces.

Knurling on Blades:

Shredders contain cutting discs (also known as blades) to shred plastic as it passes through the shredder. The left of FIG. 3 shows a normal cutting disc 32 having blades 34 for cutting a material into strips. Knurled cutting disc 36 comprises knurled faces 38 that indent or poke through the material. The shredding process is conducted in the presence of solvent. This creates increased surface area and increased crazing.

Figure 4:
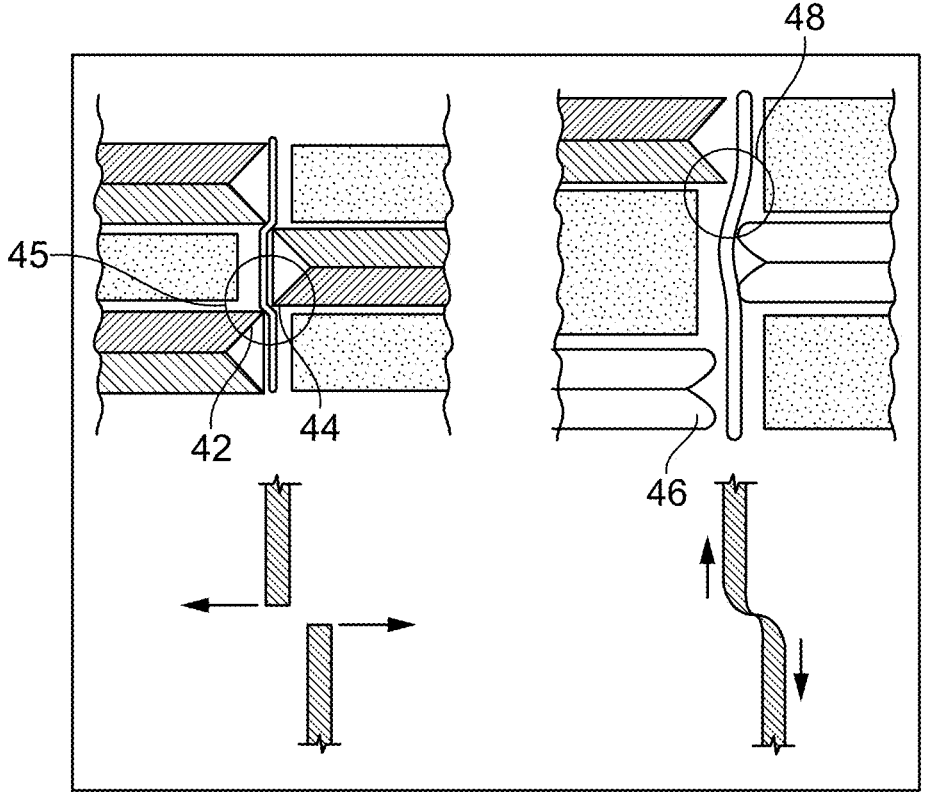
FIG. 4 shows a shredder having sharp, aligned blades (left) and a shredder arranged for applying tension utilizing dull blades or blade misalignment (right).

Dull Blades or Lack of Alignment:

To increase the extent of crazing, the scissor effect (left side of FIG. 4) of shredders is reduced. Where sharp blades 42 and 44 are aligned in region 45, the plastic fails in shear. Dull blades 46 do not cut the plastic but, instead, place the sheet in tension thus enhancing crazing in the presence of a solvent. Similarly, a misalignment 48 between opposing sets of blades (either sharp or dull) likewise places the sheet in tension. In some embodiments, misalignment can be defined where the opposing blade tips are farther apart than 3 mm or 5 mm. Sharp blade tips can be defined functionally as tending to cut rather than pull in the majority of close contacts.

Figure 6A:
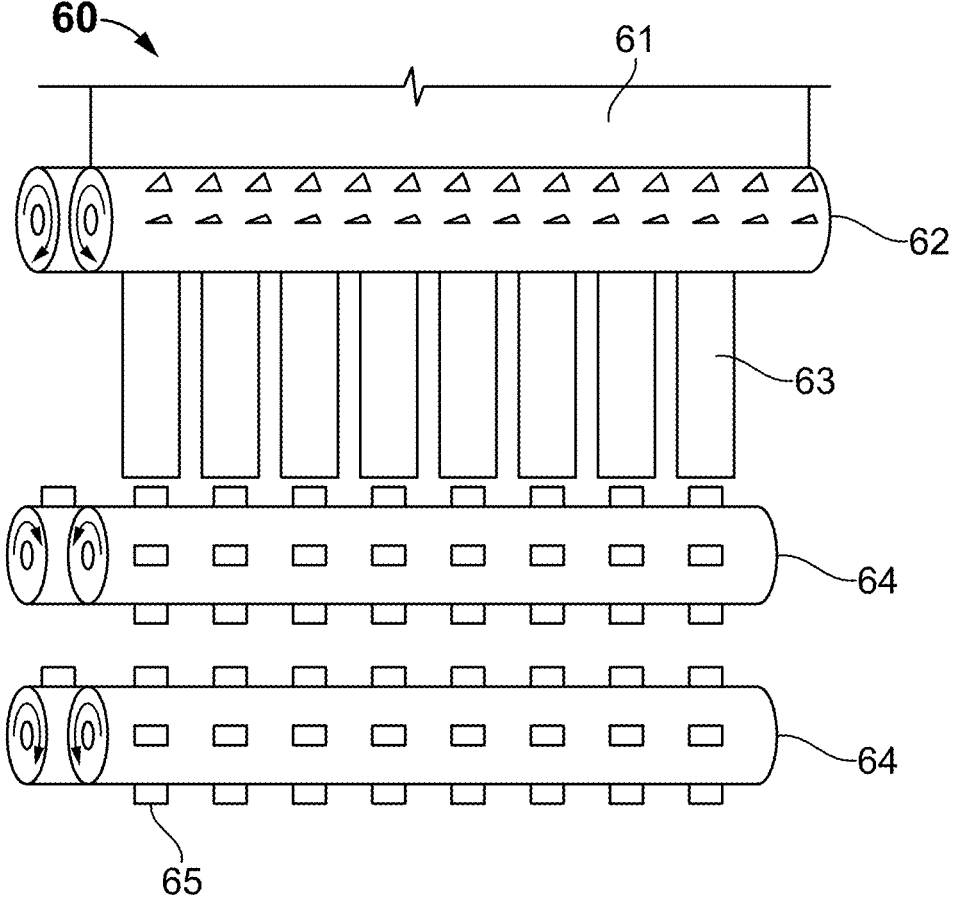
FIG. 6A illustrates crazing apparatus comprising a stretching mechanism.
Figure 6B:
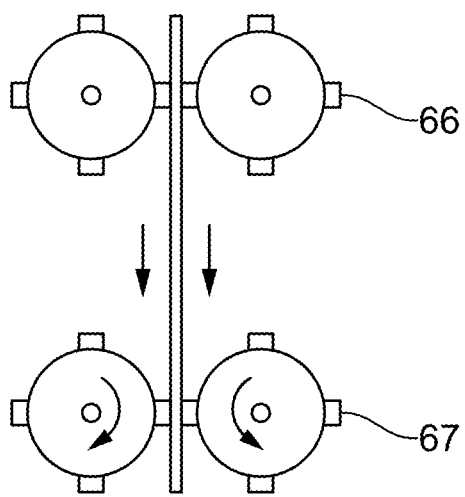
FIG. 6B illustrates a side view of the apparatus of FIG. 6A.

FIG. 6A illustrates crazing apparatus 60. Plastic material is passed between shredder bars 62. The plastic material may be cut into ribbons 63. Stretcher mechanism 64 contains knobs 65. A side view of stretcher mechanism 64 is shown in FIG. 6B. Roller bar set 66 pulls a ribbon section from the shredder bars. Pulling through roller bar set 67 while the ribbon is clamped between roller bars 66 creates a tensile stress in the plastic ribbon between the bar sets 66, 67. In preferred embodiments, a solvent is sprayed onto the plastic material while it is tension.

Figure 7:
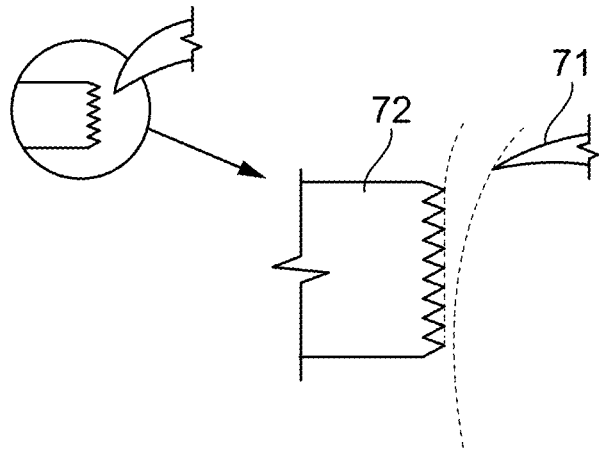
FIG. 7 illustrates a design in which plastic (dashed line) is engaged by a blade tooth and dragged over a serrated cutting die.

FIG. 7 illustrates a design for enhancing crazing. Plastic (dashed line) is engaged by blade tooth 71 and is dragged over serrated cutting die 72 which grabs the sample as it passes creating tension in the sample.

The crazed plastic articles having enhanced surface area can be treated with enzymes or enzyme-generating microorganisms. Non-limiting examples of enzymes include: cutinase, lipase, esterase, carboxylesterase, p-nitrobenzylesterase, protease, serine protease, amidase, arylacylamidase, urethanase, oligomer hydrolase, laccase, peroxidase, haloperoxidase, lipoxygenase, mono-oxygenase, di-oxygenase and hydroxilase. Non-limiting examples of enzyme-generating organisms include: *Ideonella sakaiensis, Thermobifida fusca, Idiomarina, Marinobacter, Exiguobacterium, Halomonas, Ochrobactrum*, transformed or engineered *Escherichia Coli* expressing any of the above mentioned enzymes, and transformed or engineered *Pseudomonas putida* expressing any of the above mentioned enzymes. Other microorganisms known to degrade polymers are suitable for use in the invention and include: *Amycolatopsis, Tritirachium, Kibdelosporangium, Actinomadura, Biomectria, Thermomonospora, Isaria, Bacillus, Acinetobacter, Arthrobacter, Pseudomonas, Sphingomonas, Saccharomyces, Aspergillus, Fusarium, Beauveria, Brevibacillus, Candida, Chaetonium, Cladosporium, Comamonas, Coriolus, Coryneformes, Corynebacterium, Cunninghamella, Delftia, Dictyoglomus, Diplococcus, Engyodontium, Enterobacter; Flavobacterium, Gliocladium, Hansenula, Kluyveromyces, Leptothrix, Listeria, Microbacterium, Micrococcus, Moraxella, Mortierella, Mucor, Mycobacterium, Nocardia, Paecylomyces, Paenibacillus, Penicillium, Phanerochaete, Pleurotus, Proteobacterium, Proteus, Pullularia, Rahnella, Ralstonia, Rhodococcus, Saccharomyces, Serratia, Sphingomonas, Streptomyces, Staphylococcus, Stenotrophomonas, Streptococcus, Talaromyces, Trametes, Trichoderma*, and *Vibrio*. See Boisart et al. US 2016/0280881 incorporated herein as if reproduced in full below.

Figure 8:
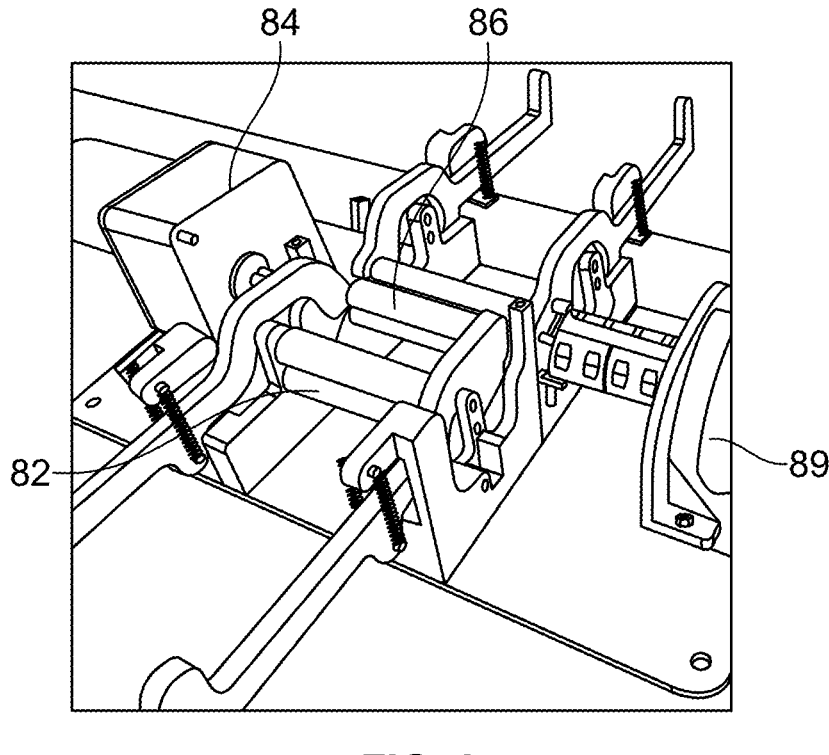
FIG. 8 illustrates the tensioning-shredder apparatus used in Example.
Figure 9:
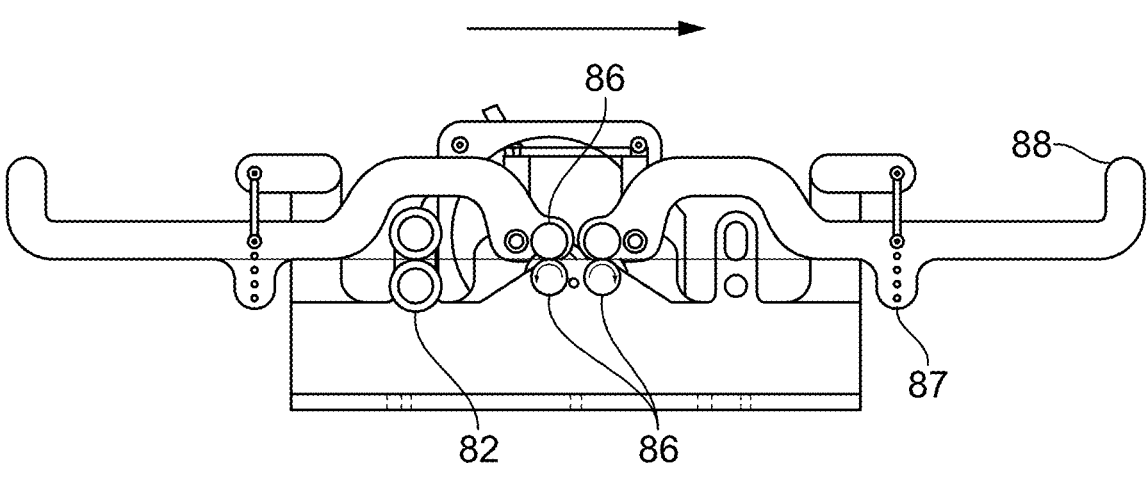
FIG. 9 is a schematic side view of the apparatus of FIG. 8.

Example 1-3 Crazing unit (apparatus) for processing plastic samples. This system is designed to wet a sample plastic material with solvent immediately before applying a tensile load. This is done to initiate crazing in the material. The apparatus shown in FIG. 8 was used to process plastic samples. Butanol was applied to felt rollers 82. A plastic sample is fed between felt rollers 82 to apply butanol to sample surface, and advanced up to rollers 86. In other embodiments, the solvent could be applied by spraying or a drip onto the sample as it passes into rollers, so long as the sample is fully wetted, which is important for achieving accessible morphology. Motors 84 and 89 turn rollers 86. The spacing between the rollers is selected to allow the tensioning effect to be achieved on discrete objects (not a film), such as crushed water bottles, packaging containers, articles of clothing, and other plastic waste. Once the sample is engaged in both sets of rollers, the motor is turned on such that it pulls the sample (tensioning it). Rear handles 88 with adjustment holes 87 are also shown.

Rollers 86 are knurled to increase the friction and prevent slipping. ("Medium" diamond knurling with 0.615 inch diameter. ×0.312 inch wide rollers). Due to the 67+ pounds of web tension created by the rollers, finite element analyses (FEAs) were performed to verify failure would not occur in the parts. The FEAs were performed with a 5 inch sample width (i.e. 100 lbf of web tension), which represents the maximum sample width intended for this design. The resultant peak stress was 286 MPa. Due to the peak stress, 17-4 PH (i.e., 630) Stainless Steel Condition A was selected as the material for rollers 86. 303/304 stainless steel was determined to be insufficiently strong with a 206-241 MPa yield stress. Additionally, the corner radius was designed to reduce the stress concentration factor for structural integrity.

Motor 84 is the drive motor that pulls a sample forward during operation. Motor 89 is a stepper motor with encoder, with a 20:1 gear ratio, capable of 2.0 N-m torque and 64 RPM rotational speed for 50 mm/sec linear feed rate sufficient to achieve the required tension for crazing. Motor 84 is the system's torque motor that resists material forward motion for tensioning. A minimum torque and speed requirement for this motor was calculated to be 2.0 N-m and 64 RPM, respectively, in order to achieve crazing.

As a non-limiting example, specifications for the crazing unit were calculated and set based on above described experiments with butanol solvent applied manually and tensioning performed with a laboratory Instron instrument. Based on Instron testing (see Example 5), the craze initiation stress was determined. The subsequent force (web tension) was determined based on the equivalent initiation stress. A maximum web tension that the design can accommodate is 267N for a 3 inch wide and 0.22 mm thick sample of plastic, although scaled designs could accommodate larger pieces of plastic. Based on the web tension, the required friction force (and therefore normal force) was determined. The exerted pinch force between rollers is 668N, with a material feed rate of 50 mm/sec. Insufficient pinch force or excessive feed rate can result in material slipping, insufficient material tensioning and ineffective formation of accessible morphology.

TABLE 1

Calculated specifications for crazing unit based on data from laboratory experiments with PET film using manual application of butanol solvent and Instron application of tension

| | Variable | Value | Units |
|---|---|---|---|
| Instron Testing | Sheet Thickness | 0.22 | mm |
| | Sheet Width | 25.4 | mm |
| | Load | 89 | N |
| | Stress to Craze | 15.9 | Mpa |
| | Strain Rate | 6.0 | mm/min |
| | | 0.1 | mm/sec |
| Crazing Unit | Sheet Thickness | 0.22 | Mm |
| Specifications | Sheet Width | 76.2 | Mm |
| | | 3 | In |
| | Required Load | 267 | N |
| | Roller Diameter | 15 | Mm |
| | Motor Output Torque | 2003 | N-mm |
| | | 2.0 | N-m |
| | | 284 | oz-in |
| | | 18 | in-lbf |
| | Material Feed Rate | 50 | mm/sec |
| | Motor 1 Output RPM | 63.66 | RPM |
| | Motor 1 Power Output | 13.35 | W |

For experiments to demonstrate the apparatus, PET film was obtained from Goodfellow (ES301445) with a thickness of 0.22 mm. The crystallinity of this material was determined to be approximately 4% by DSC. A control experiment was also carried out where the PET film was soaked in butanol. No effect or change in appearance was observed.

Example 1. In a first set of experiments, PET film was characterized by just applying the tensioning on the surface of the samples. In these cases, the plastic exhibited brittle behavior, which resulted in very localized yielding/deformation instead of along the entire sample length. Because the yielding was so localized, crazing was not achieved. Examination of the films shows no visible change in appearance.

Example 2. Next, butanol was applied to the sample by incorporating two rollers dedicated to wetting the sample. One for wetting the top of the plastic, and one for wetting the bottom of the plastic. Each roller had felt that was wrapped around the it. The felt was then soaked with Butanol. The felt rollers touched each other until the sample was fed through them. Compared to Example 1, the material exhibited significantly more plastic deformation before failure. The plasticity was so much higher that the material often causing necking, or a reduction in cross-sectional area as the polymer chains align and stretch. This necking behavior eventually necked so small that it broke, subsequently preventing the material from continuously advancing through the rollers.

Example 3. We conceived of a new approach, which we refer to as stuttered tension. Because polymers typically increase in stiffness with the shorter duration of applied force (for example, silly-putty), then if the rollers are rotated at a short burst, then the material was stiff enough to advance through the rollers. Then, a brief pause of the material while under tension allows some necking (and subsequent crazing) to occur. However, that region is now weakened. But, if the short stutter (i.e. quick application of force) is applied again, the material stiffness has increased sufficiently to allow the material to advance. This mitigates the issues associated with too much necking. Samples processed in this way exhibited the change in appearance, e.g., whiteness, associated with the desired effect. Finally, we showed that the dwell time under tension can be used as a parameter to improve the accessible morphology. Without a dwell time, the samples were less white.

The resultant sample processed with stuttered tension/dwell showed an increase in crystallinty, determined by DSC. It increased from 4% to approximately 47%.

The selected web tension, craze initiation stress, and friction force are dependent on material width and thickness. For our sample width of 5 inch, the peak stress was 286 MPa. We use FEA and specifically design the parts and select part material to ensure part failure will not occur. Our process must have intermittent tensioning as the material advances that achieves an interplay between solvent exposure time, viscoelastic deformation, and relaxation. These work in concert to craze with high surface area and enzyme accessibility while preventing or substantially reducing material necking.

Process Conditions to Increase Enzyme Accessibility

PET film was obtained from Goodfellow (ES301445) and had a thickness of 0.22 mm. The crystallinity of this material was determined to be approximately 4% by DSC. PET film was cut into size of 1 inch wide and 12 inch long for Instron experiments.

Comparative Example 1. The sample was wetted with ethanol by many methods suggested in prior art, including pre-wetting and then clamping into the Instron or placing a droplet of the solvent on the sample while on the Instron; then applying tensile stress. We did not find these to be effective for our large dimension samples. Instead, we developed a method that could be transitioned to the setup for Example 3, a wetting sponge. For Instron samples, the sample was first clamped into the Instron; then a piece of absorbent material (a blue PIG wipe) was placed in contact with the sample and partially closed with Parafilm to keep it in place and prevent evaporation. Ethanol was added to the absorbent material. The sample was stretched at 6 mm/s to 200% strain; the sample appearance turned from clear to white, associated with the formation of crazes. The wetting sponge was removed and the sample was air dried under tension for 10 minutes at room temperature. After removing from the Instron, the sample was analyzed by optical microscopy and scanning electron microscopy. Optical microscopy shows the presence of parallel, open cracks, which are perpendicular to the direction of strain. The morphology of the material was difficult to assess, to SEM was used to examine the crack morphology (Image a, in the Figure below). We can define a craze density by counting the number of struts per mm. The craze density in this sample is approximately 40 crazes per mm. The openings into the sample are approximately 2-7 $\mu$m, though the many of them are only at the surface or fused closed, and do not penetrate deeply into the samples. While some crazing obviously occurred, this material does not have good accessibility for enzymes.

Comparative Example 2. The sample was wetted with ethanol with the wetting sponge, as above. The sample was stretched at 6 mm/s to 200% strain; the sample appearance turned from clear to white, associated with the formation of crazes. The wetting sponge was removed and the sample air-dried under tension for 10 minutes, removed from the Instron and then post-treated at 100° C. for 30 minutes. This sample was analyzed by optical microscopy. Compared to Comparative Example 1, the craze density is higher (approximately 90 crazes per mm) and they obviously penetrate more deeply into the sample (Image b, in the figure below), with many bundles of struts evident. However, the struts are thick, greater than 10 $\mu$m, and there is evidence of fusion between the struts, closing off the accessibility to the enzymes.

Figures 10A, 10B, 10C, 10D:
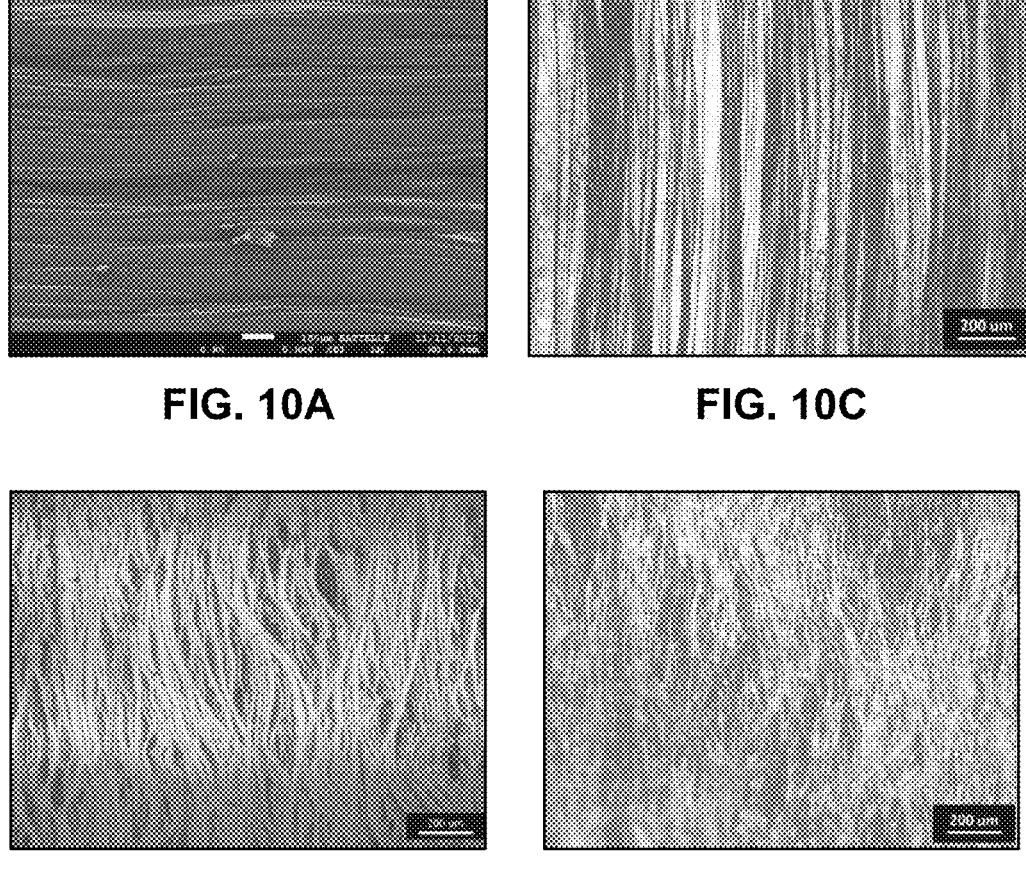
FIG. 10 (a) Scanning electron microscopy image of PET prepared by method described in Comparative Example 1; (b) Optical microscopy image of PET that was prepared by method described in Comparative Example 2, using ethanol; (c) Optical microscopy image of PET that was prepared by method described in Example 4, using butanol; (d) Optical microscopy image of PET that was prepared by method described in Example 5, using butanol.

Example 4. The sample was wetted with butanol using the wetting sponge method. The sample was stretched at 6 mm/s to 50% strain; the sample appearance turned from clear to white, associated with the formation of crazes. The wetting sponge was removed and the sample air-dried for 10 min under tension. This sample was analyzed by optical microscopy. The craze density is approximately 40 crazes per mm (Image c, in FIG. 10).

Example 5. The sample was wetted with butanol by using the wetting sponge method. The sample was stretched at 6 mm/s to 200% strain; the sample appearance turned from clear to white, associated with the formation of crazes. The wetting sponge was removed and the sample air-dried for 10 minutes under tension. This sample was analyzed by optical microscopy. This sample exhibits a morphology that increases its reactivity to enzymes. The craze density is quite high, greater than 120-130 crazes per mm. The sample is comprised of, what appear to be many fibers, having a distribution of openings penetrating into the sample. The struts/fibers are approximately 3-7 $\mu$m wide and many openings that are 10-20 $\mu$m wide. It should be evident that such a porous structure will provide good access to enzymes, and even microbes, in a heterogeneous reaction.

For PET, butanol is better than ethanol for forming the desired morphology due to two main components. The first is that it is less volatile and has lower surface energy, which promotes new surface formation during crack/pore formation. The second is that it has stronger interaction with PET, as evident by comparing the Hansen solubility parameters, specifically the dispersive component. Butanol has high dispersive interaction but does not fully dissolve the material. We also note the potential differences in the stability of the formed structure. Butanol-crazed samples do not require a thermal post-treatment to heal or stabilize the cracks. Crack/pore closure was noted in the ethanol-prepared samples that were heat treated. Analysis of the butanol-crazed samples suggests that the better stability of porous structure may be due to crystallization of the PET.

The specific surface area related to microscale features can be estimated based on a cuboid geometry to represent a film and the density of PET as 1.4 g/cm3. Our crazing process essentially thinned the sample from 250 $\mu$m to 3 $\mu$m, increasing the surface area per unit mass from 60 cm2/g to 4765 cm2/g, not accounting for the nanopores that exist within each strut.

We did try to measure the surface area of samples using BET; however, amorphous plastics are extremely challenging to characterize by this method due to diffusion of gases into/out of sample and difficulty in degassing the samples. The specific surface area of the sample from Example 3 was 7.27 m2/g (72,700 cm2/g). The control PET (untreated) had specific surface area of 1.67 m2/g; whereas other control samples were 0.34 m2/g.

Desired Morphology to Maximize Reactivity

We performed simulations to evaluate the effectiveness of different morphologies to enhance heterogeneous reaction with enzymes, using a coarse-grained molecular dynamics approach using dissipative particle dynamics (DPD) forces for meso-scale soft matter interactions. Atoms and molecules were approximated through local 'bead particles' which constitute some local volume that contains these molecules. We deployed a custom software package for reactive flowing porous media and EspressoMD, the high performance MD library designed for soft-matter simulations. Our methodology accounts for fluid dynamics equations and local chemical reactivity, to examine natural concentration gradients that form and drive flow behavior via diffusion.

PET pore networks were approximated by connecting PET particles beads, procedurally, to generate pore networks. The enzyme was single 5 nm diameter enzyme bead as the simulation unit. This is an upper bound diameter for one enzyme. On the surface of this enzyme bead is a small region (~10%) of 'active' enzyme surface area. This represents the chemically active area of the enzyme which can initiate de-polymerization of PET. Water 'beads' are similarly sized and are composed of ~6000 water molecules. PET particle beads typically encompass less than 50 monomer units, and each packet of 50 and are bound together into long curled chains with a very strong local spring force. The enzyme reaction time constant was tuned to 1 (15 ns) with a local interaction range. This interaction only occurs when the active area of the enzyme bead is within 0.5 nm of the PET bead during this timestep. This high reaction rate implies that the depolymerization event is mass transport limited and not reaction time limited. The current reaction event consumes the PET by breaking the local bonds to the rest of the monomer units, and then the inactive enzyme diffuses away and is unable to react again during the simulation time. Mass density of the beads is incorporated from known values. A room temperature simulation (25 meV) scales the time step to be 15 ns. During the simulation, PETase enzyme particles are systematically replenished as they diffuse to and react with the PET. A local volume far from the PET particles is kept at a constant concentration of enzyme to represent an infinite bath of nearby active enzyme. The inactive enzymes must diffuse away from the PET naturally, while the new enzyme beads diffuse towards the reactive sites.

The time to degrade 50% PET in the simulated reaction was taken as an indicator of reactivity. Shorter times are higher reactivity. The results for one set of simulations are shown in the table. In these experiments, the total surface area of the PET is not constant. Both pore density and pore diameter are strong drivers for reactivity. Importantly, pore diameter less than approximately 15 to 20 nm, or 3-5 times the diameter of the enzyme (e.g., 5 nm) has a negative effect on reactivity.

| Enzyme Concentration | Pore Density | Pore Diameter (nm) | Time to Degrade 50% of Amorphous PET in Simulated Reaction (ms) |
|---|---|---|---|
| 1% | 1% | 10 | 30 |
| 1% | 1% | 15 | 16 |
| 1% | 1% | 20 | 5.6 |
| 5% | 10% | 10 | 4.0 |
| 5% | 10% | 15 | 1.1 |
| 5% | 10% | 20 | 0.3 |

The presence of pores smaller than 15 nm in prior art compositions may be related to the instability of the nanoscale pores created by the process. Indeed, Arzhakova et al discloses the challenge of preserving and stabilizing the porosity achieved from crazing the amorphous phase of semicrystalline structures. They propose annealing to stabilize the structure. Annealing requires heat treatment; our Comparative Example 2 shows that thermal annealing can fuse microscale features. We have shown that the structures can be stabilized by choosing the right solvent and promoting stabilizing processes in the process flow. As described in Example 3, the crystallinity of the PET is increased after being processed through the crazing unit. This stabilizes the desired larger pore structure not observed in the prior art.

What is claimed:

1. A plastics degrading system, comprising:
a shredder;
a plastic feed passing through the shredder;
a solvent contacting the plastic feed;
wherein the plastic feed is in the form of a film or sheet;
wherein the shredder comprises a pair of rollers disposed below, in the direction of gravity, a hinged trap door, wherein the trap door has a first edge opposite to a side having a hinge, and the first edge is adjacent a fixed surface, and a cam wheel positioned against the trap door such that rotation of the cam wheel periodically cycles the trap door between an open position and a closed position in which the first edge is pressed toward the fixed surface such that the plastic feed is held between the first edge and the fixed surface; and
wherein the shredder optionally further comprises one or any combination of the following:
a serrated or knurled cutting blade adapted to indent the plastic feed as it goes through the shredder;

blades that are angled or with a spacing to form cutters configured to increase tension on the plastic feed as it passes through the blades;
a spring loaded pair of blades;
at least two pairs of rollers that are adapted to stretch pieces of the plastic feed held between the pairs of rollers;
a serrated die and a movable blade tooth configured such that pieces of the plastic feed contacts and is held by a surface of the serrated die and the movable blade tooth engages and pulls the feed to generate tension in the feed.

2. The system of claim 1 further comprising one or more spray nozzles configured to spray the solvent at the plastic feed as it passes through the system.

3. The system of claim 1 wherein the solvent comprises ethanol or butanol.

4. The plastics degrading system of claim 1 wherein the shredder comprises the at least two pairs of rollers that are adapted to stretch pieces of the plastic feed held between the pairs of rollers.

5. The plastics degrading system of claim 4 wherein the at least two pairs of rollers have projections on roller surfaces that engage the plastic feed.

6. The plastics degrading system of claim 1 wherein the shredder comprises the serrated die and the movable blade tooth configured such that pieces of the plastic feed contacts and is held by the die surface of the serrated die and the movable blade tooth engages and pulls the plastic feed to generate tension in the plastic feed.

7. The plastics degrading system of claim 1 wherein the solvent is an organic solvent.

8. The plastics degrading system of claim 7 wherein the solvent comprises ethylene glycol, isopropanol, anisole, toluene, dichloromethane, ethyl acetate, heptane, acetonitrile, t-butyl methyl ether, acetone, methanol, ethanol, propanol, butanol, or combinations thereof.

9. The plastics degrading system of claim 8 having a mass ratio of the plastic feed to the solvent in a range of 100 to 0.01.

10. The plastics degrading system of claim 8 having a mass ratio of the plastic feed to the solvent in a range of 10 to 0.1.

11. A plastics degrading system, comprising:
a shredder;
a plastic feed passing through the shredder;
an organic solvent contacting the plastic feed as the plastic feed passes through the shredder;
wherein the shredder comprises one or any combination of the following:
blades that are misaligned to form cutters configured to increase tension on the plastic feed as it passes through the blades;
at least two pairs of rollers that are configured to stretch pieces of the plastic feed held between the pairs of rollers; or
a serrated die and a movable blade tooth configured such that pieces of the plastic feed contacts and is held by the die surface and the movable blade tooth engages and pulls the plastic feed to generate tension in the plastic feed.

12. The plastics degrading system of claim 11 wherein the shredder comprises the blades that are misaligned.

13. The plastics degrading system of claim 12 wherein the misaligned blades comprise opposing blade tips that are farther apart than 3 mm.

14. The plastics degrading system of claim 13 wherein the misaligned blades comprise opposing blade tips that are farther apart than 5 mm.

\* \* \* \* \*